(12) United States Patent
Myers et al.

(10) Patent No.: US 11,225,872 B2
(45) Date of Patent: Jan. 18, 2022

(54) TURBINE BLADE WITH TIP SHROUD COOLING PASSAGE

(71) Applicant: General Electric Company, Schenectady, NY (US)

(72) Inventors: Melbourne James Myers, Woodruff, SC (US); Michael Anthony Wondrasek, Greenville, SC (US); Mary Virginia Holloway, Simpsonville, SC (US); Luke C. Sponseller, Greer, SC (US); Brandon Joseph Kerins, Greenville, SC (US)

(73) Assignee: General Electric Company, Schenectady, NY (US)

( * ) Notice: Subject to any disclaimer, the term of this patent is extended or adjusted under 35 U.S.C. 154(b) by 86 days.

(21) Appl. No.: 16/674,059

(22) Filed: Nov. 5, 2019

(65) Prior Publication Data
US 2021/0131291 A1 May 6, 2021

(51) Int. Cl.
*F01D 5/18* (2006.01)

(52) U.S. Cl.
CPC .......... *F01D 5/187* (2013.01); *F05D 2220/32* (2013.01); *F05D 2260/221* (2013.01)

(58) Field of Classification Search
CPC .......... F05D 2240/81; F05D 2240/307; F01D 5/187; F01D 5/225; F01D 5/20; F01D 5/18; F05B 2240/33; F05B 2240/801
See application file for complete search history.

(56) References Cited

U.S. PATENT DOCUMENTS

| | | | |
|---|---|---|---|
| 3,527,544 A * | 9/1970 | Allen | F01D 5/225 416/90 R |
| 6,499,950 B2 | 12/2002 | Willett et al. | |
| 6,761,534 B1 | 7/2004 | Willett | |
| 6,811,378 B2 * | 11/2004 | Kraft | F01D 5/225 416/191 |
| 6,869,270 B2 * | 3/2005 | Bunker | F01D 5/225 416/97 R |
| 7,334,993 B2 | 2/2008 | Sekihara et al. | |
| 7,568,882 B2 | 8/2009 | Brittingham et al. | |

(Continued)

FOREIGN PATENT DOCUMENTS

JP S63143704 U 9/1988

*Primary Examiner* — Courtney D Heinle
*Assistant Examiner* — Andrew Thanh Bui
(74) *Attorney, Agent, or Firm* — Charlotte Wilson; Hoffman Warnick LLC

(57) ABSTRACT

A turbine blade includes a root for fixing the turbine blade to a turbine rotor; and an airfoil coupled to the root, the airfoil including a suction side and a pressure side, and at least one internal wall defining a coolant chamber in the airfoil for delivering a coolant through the airfoil. A tip shroud is coupled to a radially outer end of the airfoil by a suction side fillet and a pressure side fillet. The tip shroud includes a shroud body defining a substantially trident-shaped shroud cooling passage including: a trunk cooling passage, a center cooling passage in fluid communication with the trunk cooling passage, a suction side cooling passage in fluid communication with the trunk cooling passage, and a pressure side cooling passage in fluid communication with the trunk cooling passage. The center cooling passage is fluidly coupled to the coolant chamber to receive a coolant.

20 Claims, 11 Drawing Sheets

(56) References Cited

U.S. PATENT DOCUMENTS

| | | | |
|---|---|---|---|
| 7,686,581 B2 | 3/2010 | Brittingham et al. | |
| 9,127,560 B2 | 9/2015 | Collier et al. | |
| 10,184,342 B2 * | 1/2019 | Zhang | F01D 5/187 |
| 10,472,974 B2 * | 11/2019 | Jones | F01D 5/187 |
| 10,502,069 B2 * | 12/2019 | Jones | F01D 5/225 |
| 10,577,945 B2 * | 3/2020 | Brittingham | F01D 5/20 |
| 10,590,777 B2 * | 3/2020 | Brittingham | F01D 5/20 |
| 2017/0114645 A1 | 4/2017 | Chouhan et al. | |
| 2017/0114647 A1 | 4/2017 | Chouhan et al. | |
| 2017/0175535 A1 | 6/2017 | Chouhan et al. | |
| 2017/0175536 A1 | 6/2017 | Jaiswal et al. | |
| 2017/0183971 A1 * | 6/2017 | McDufford | F01D 5/225 |
| 2017/0342843 A1 | 11/2017 | Willett, Jr. | |

\* cited by examiner

TURBINE BLADE WITH TIP SHROUD COOLING PASSAGE

BACKGROUND

The disclosure relates generally to turbomachines and, more particularly, to a tip shroud cooling passage for a tip shroud of a turbine blade.

Gas turbine (GT) systems are used to generate power in a wide variety of applications. Rotating blades in the turbine of the GT system are exposed to very high temperatures and loads. Tip shrouds are positioned at a radially outer ends of the rotating blades and interact with an internal surface of a stationary casing to create a flow path for combustion gases in the turbine. The tip shroud is coupled to an airfoil by fillets. The airfoil extends from the tip shroud to a root of the rotating blade. Hence, the fillets help hold the parts together and experience high stress.

Current GT systems operate at ever increasing temperatures. As the temperatures increase, tip shroud creep increases, limiting the life span of the rotating blades at the fillets. Current approaches to increase cooling effectiveness in high stress regions employ intricate cooling circuits within the tip shroud that limit placement of other structures and that may create areas of high stress and/or fatigue.

BRIEF DESCRIPTION

A first aspect of the disclosure provides a turbine blade, comprising: a root for fixing to a turbine rotor; an airfoil coupled to the root, the airfoil including a suction side and a pressure side, and at least one internal wall defining a coolant chamber with the airfoil for delivering a coolant through the airfoil; and a tip shroud coupled to a radially outer end of the airfoil by a suction side fillet and a pressure side fillet, wherein the tip shroud includes a shroud body defining a shroud cooling passage for receiving the coolant, the shroud cooling passage including: a trunk cooling passage, a center cooling passage in fluid communication with the trunk cooling passage, a suction side cooling passage separated from the center cooling passage by a first wall that terminates at an end within the trunk cooling passage, the suction side cooling passage in fluid communication with the trunk cooling passage, and a pressure side cooling passage separated from the center cooling passage by a second wall that terminates at an end within the trunk cooling passage, the pressure side cooling passage in fluid communication with the trunk cooling passage, wherein the suction side cooling passage extends adjacent the suction side fillet, and the pressure side cooling passage extends adjacent the pressure side fillet.

A second aspect of the disclosure provides a turbine blade, comprising: a root for fixing to a turbine rotor; an airfoil coupled to the root, the airfoil including a suction side and a pressure side, and at least one internal wall defining a coolant chamber in the airfoil for delivering a coolant through the airfoil; and a tip shroud coupled to a radially outer end of the airfoil by a suction side fillet and a pressure side fillet, wherein the tip shroud includes a shroud body defining a substantially trident-shaped shroud cooling passage including: a trunk cooling passage, a center cooling passage in fluid communication with the trunk cooling passage, a suction side cooling passage in fluid communication with the trunk cooling passage, and a pressure side cooling passage in fluid communication with the trunk cooling passage, wherein the substantially trident-shaped shroud cooling passage is fluidly coupled to the coolant chamber to receive a coolant therefrom.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure and therefore should not be considered as limiting the scope of the disclosure. In the drawings, like numbering represents like elements between the drawings.

DETAILED DESCRIPTION

Figure 1:
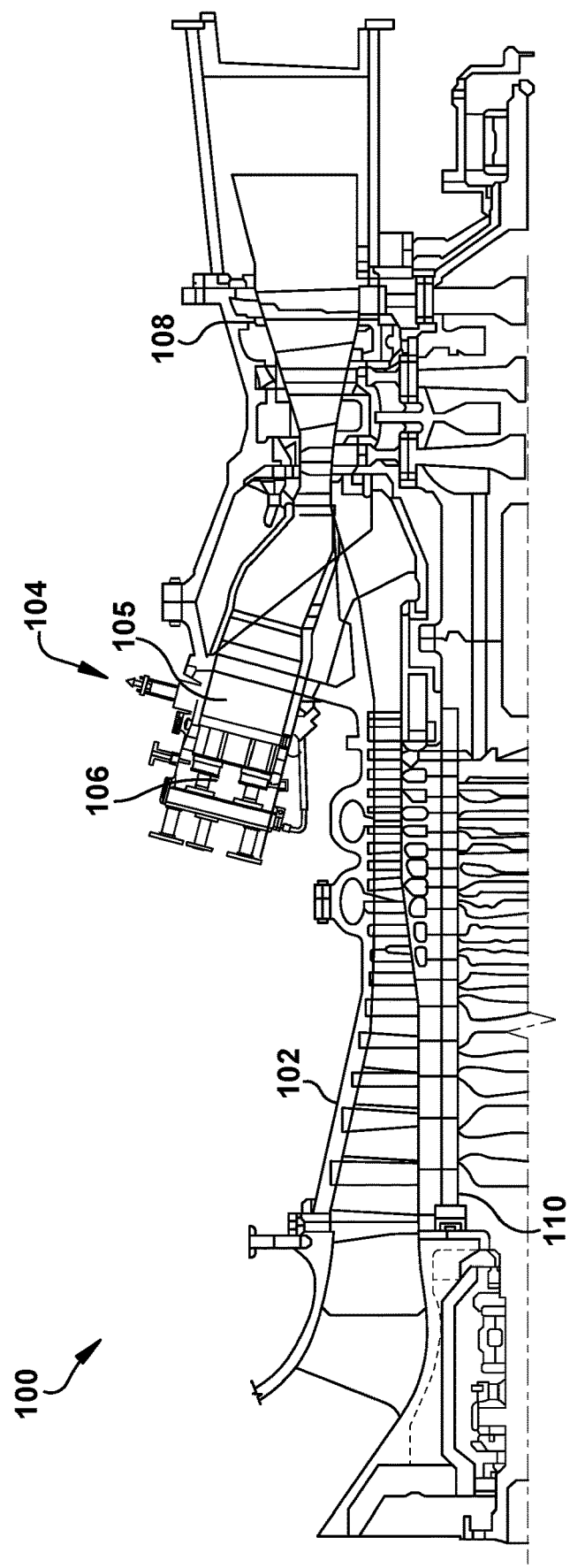
FIG. 1 is a partial schematic view of an illustrative gas turbine system.

As an initial matter, in order to clearly describe the current technology, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine system or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the system, and "aft" referring to the rearward or turbine end of the system.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a turbine blade including a tip shroud having a tip shroud cooling passage in a shroud body thereof. The tip shroud cooling passage includes a substantially trident shaped cooling passage having a trunk cooling passage, a center cooling passage, a suction side cooling passage and a pressure side cooling passage. Each of the center, suction side, and pressure side cooling passages are in fluid communication with the trunk cooling passage. The suction side cooling passage extends adjacent the suction side fillet, and the pressure side cooling passage extends adjacent the pressure side fillet. Coolant from an airfoil coolant chamber is fed to the center cooling passage, then to the other passages. The tip shroud cooling passage supplies coolant to the center of the shroud and then to the fillets to provide convective heat transfer via cross-flow behind the fillets. The tip shroud cooling passage provides a temperature reduction to the high stress fillet without the need for many intricate passages, which introduce highly stressed features that can lead to new locations for failure.

FIG. 1 is a partial schematic view of an illustrative gas turbine (GT) system 100. GT system 100 includes a compressor 102 and a combustor 104. Combustor 104 includes a combustion region 105 and a fuel nozzle assembly 106. System 100 also includes a turbine 108 and a common compressor/turbine shaft 110 (sometimes referred to as rotor 110).

In one embodiment, GT system 100 is a MS7001FB system, sometimes referred to as a 7FB system, commercially available from General Electric Company, Greenville, S.C. The present disclosure is not limited to any one particular system and may be implanted in connection with other systems including, for example, the MS7001FA (7FA) and MS9001FA (9FA) system models of General Electric Company. Further, the turbine blade described herein may be employed in any variety of turbomachine, e.g., steam turbines, jet engines, etc.

In operation, air flows through compressor 102, and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 in which gas stream thermal energy is converted to mechanical rotational energy. Turbine 108 is rotatably coupled to and drives rotor 110. Compressor 102 also is rotatably coupled to shaft 110. In the illustrative embodiment, there is a plurality of combustors 104 and fuel nozzle assemblies 106. In the following discussion, unless otherwise indicated, only one of each component will be discussed.

Figure 2:
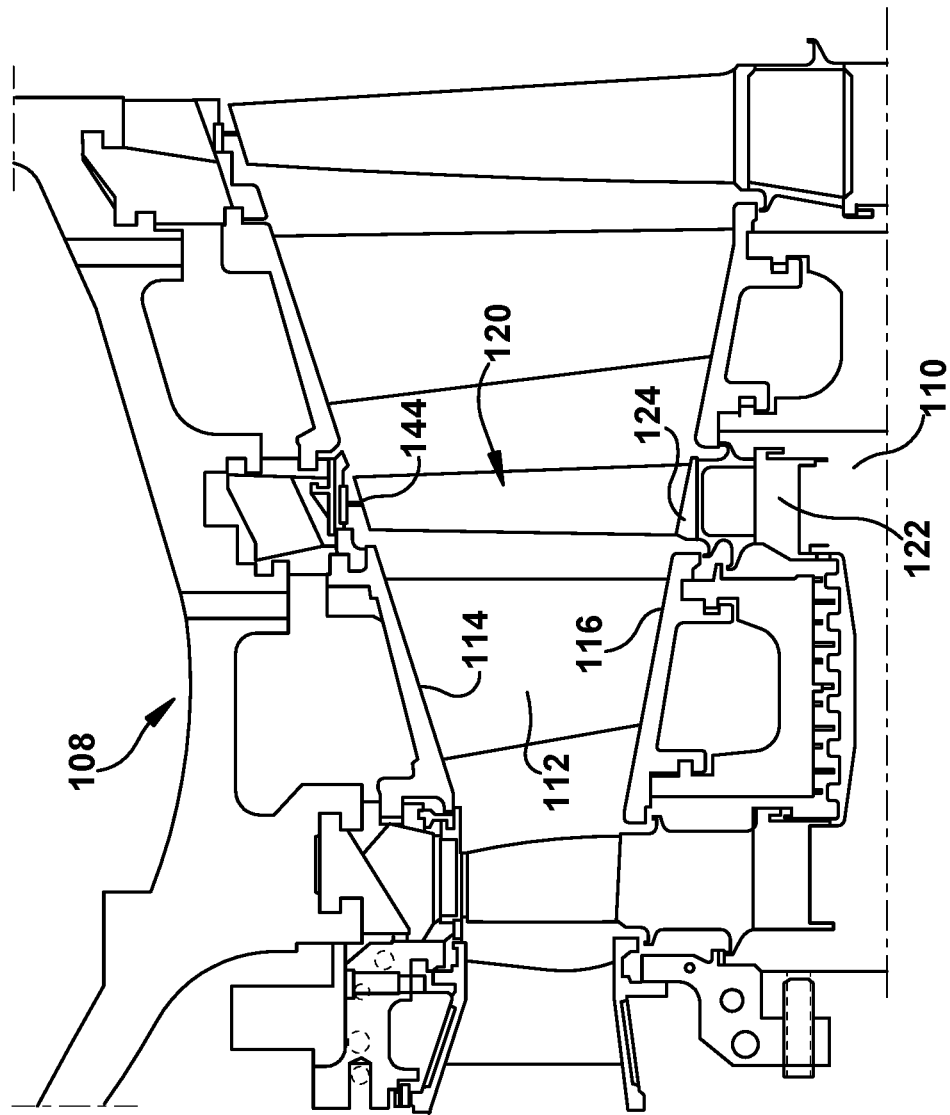
FIG. 2 is a cross-sectional view of an illustrative gas turbine assembly that may be used with the gas turbine system in FIG. 1.

FIG. 2 is a cross-sectional view of an illustrative turbine 108 that may be used with GT system 100 in FIG. 1. Turbine 108 includes a vane 112. Vane 112 is held in turbine 108 by a radially outer platform 114 and a radially inner platform 116. Turbine 108 also includes a turbine blade 120 fixed to rotor 110 by a root 122 of the turbine blade.

Figure 3:
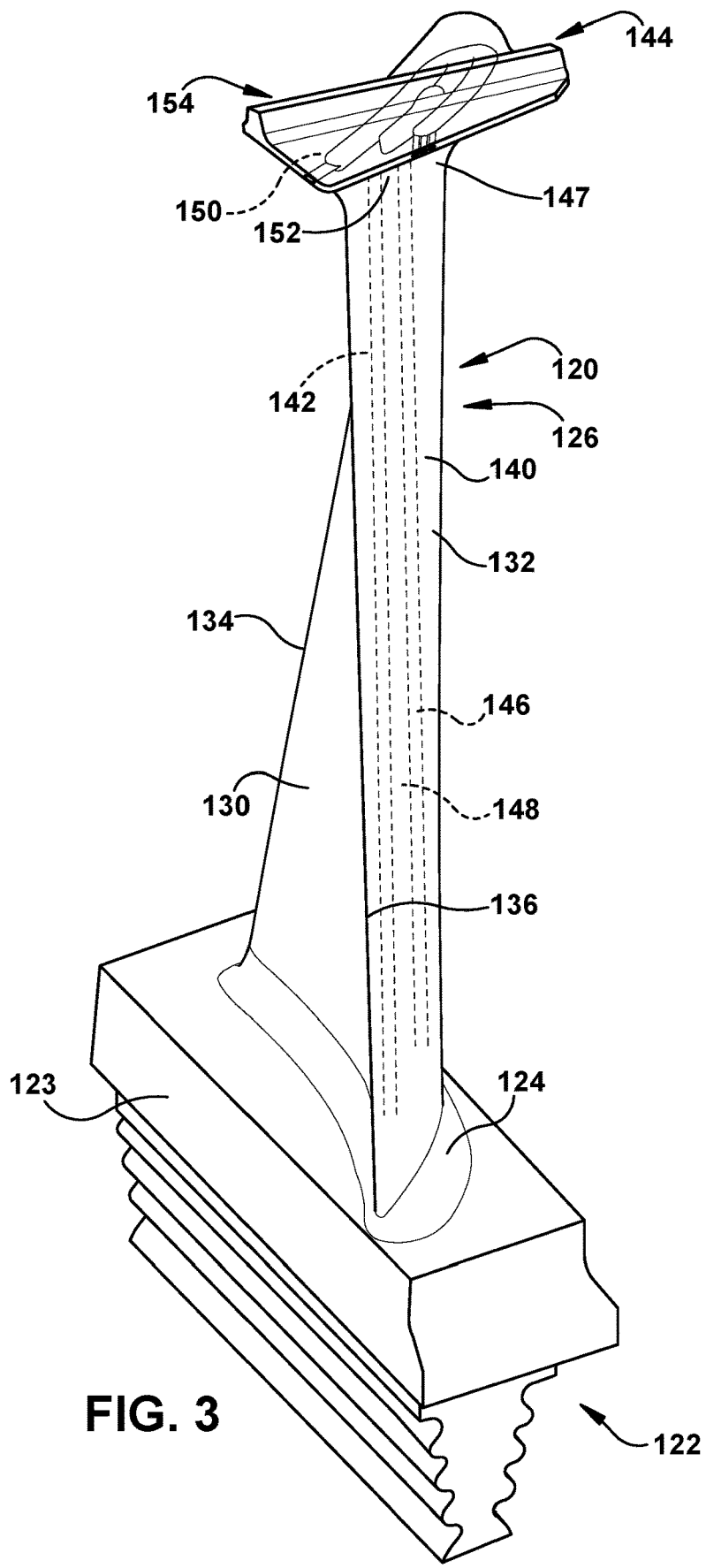
FIG. 3 is a perspective view of a turbine rotor blade of the type in which embodiments of the present disclosure may be employed.

FIG. 3 shows a perspective view of a turbine blade 120 of the type in which embodiments of the present disclosure may be employed. Turbine blade 120 includes root 122 for fixing turbine blade 120 to rotor 110 (FIG. 2). Root 122 may include, for example, a dovetail configured for mounting in a corresponding dovetail slot in the perimeter of the rotor disc. Root 122 may further include a shank 123 that extends between the dovetail and a platform 124. Airfoil 126 is coupled to root 122 and extends radially outward from platform 124. Platform 124 is disposed at the junction of airfoil 126 and root 122 and defines a portion of the inboard boundary of the flow path through turbine 108.

It will be appreciated that airfoil 126 is the active component of rotor blade 120 that intercepts the flow of working fluid and induces the rotor disc to rotate. While the blade of this example is a turbine blade 120, it will be appreciated that the present disclosure also may be applied to other types of blades within turbine 108, including turbine stationary blades 112 (FIG. 2) (vanes).

It will be seen that airfoil 126 of turbine blade 120 includes a pressure side (PS) 130 and a circumferentially or laterally distanced suction side (SS) 132 extending axially between opposite leading and trailing edges 134, 136, respectively. Sidewalls 140 and 142 that form pressure side 130 and suction side 132, respectively, extend in the radial direction from platform 124 to a tip shroud 144. At least one internal wall 146 (shown in phantom) defines a coolant chamber 148 within airfoil 126 for delivering a coolant through the airfoil 126. Coolant chamber 148 may include a single chamber (as in FIG. 3) or a number of chambers (as in FIG. 5). Coolant chamber 148 may be coupled to any source of pressurized coolant, such as, but not limited to, pressurized air from compressor 102.

Tip shroud 144 is coupled to a radially outer end 147 of airfoil 126 by a suction side fillet 150 and a pressure side fillet 152. Fillets 150, 152 couple tip shroud 144 to airfoil 126 on a hot gas path (HGP) side, i.e., radially inward side, and include arcuate surfaces between airfoil 126 and tip shroud 144. As will be described in greater detail, tip shroud 144 includes a shroud body 154 defining a shroud cooling passage 160 for receiving the coolant from coolant chamber 148.

Figure 4:
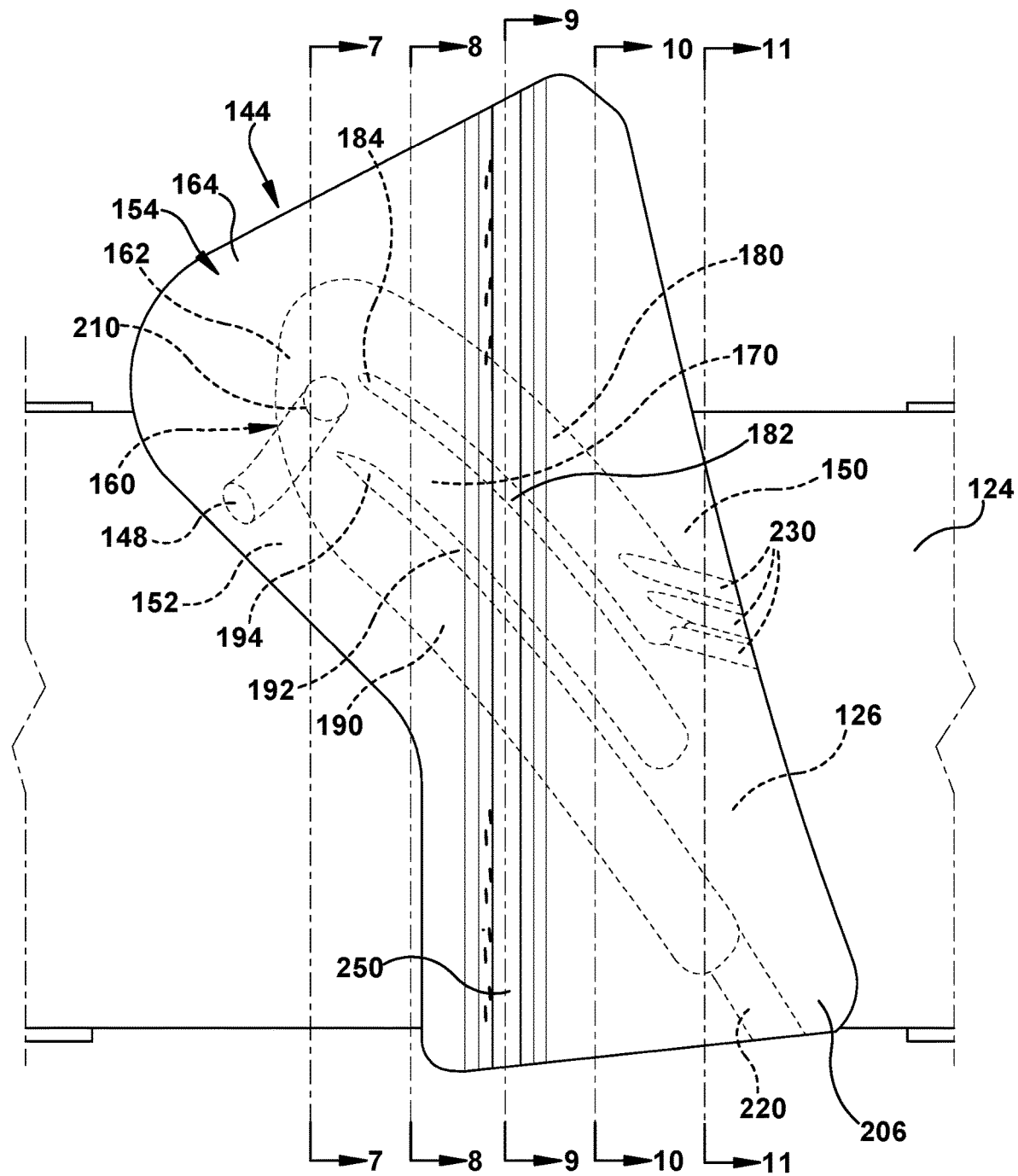
FIG. 4 is a top down view of a turbine rotor blade and tip shroud including a tip shroud cooling passage, according to embodiments of the disclosure.
Figure 5:
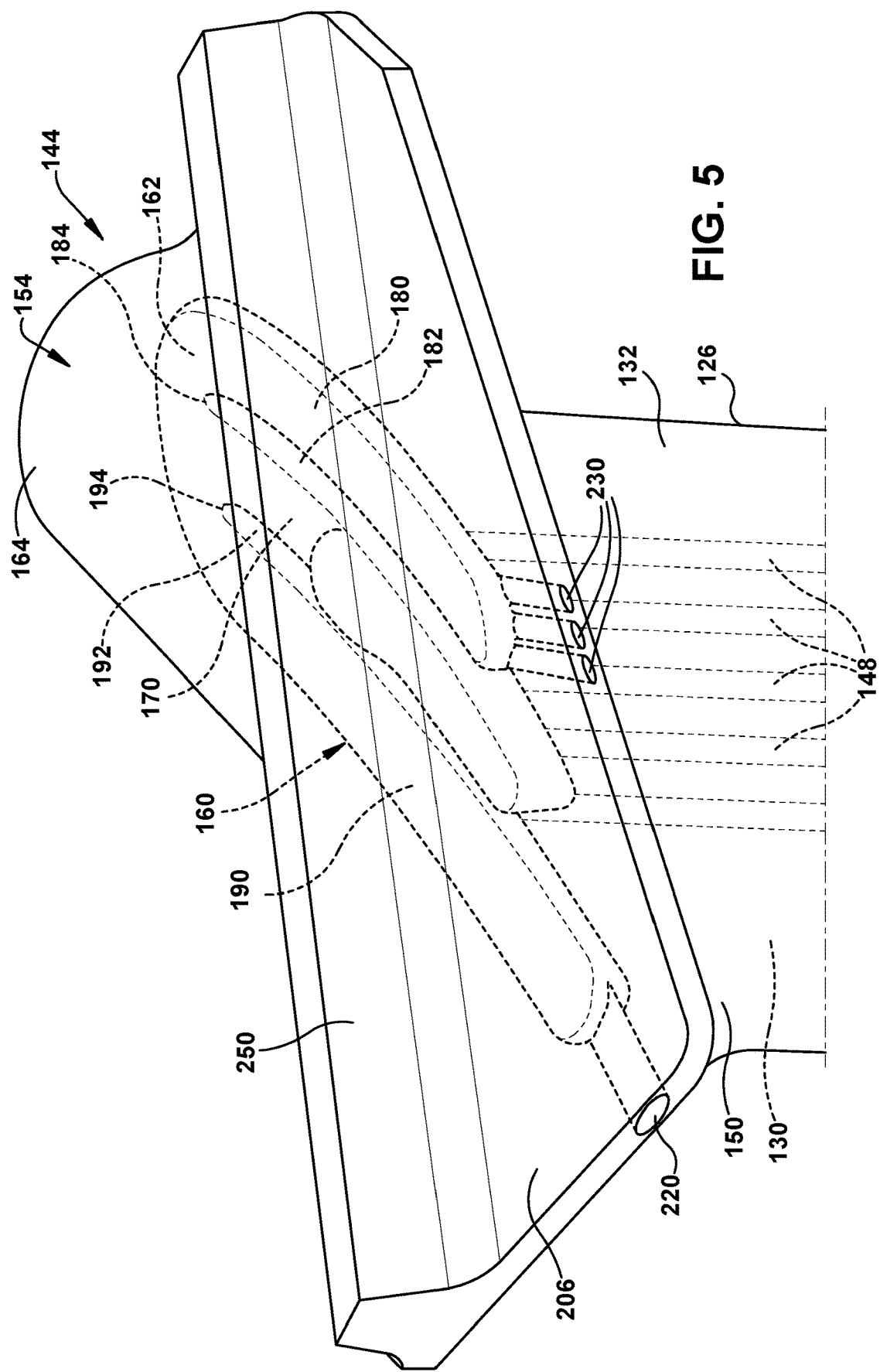
FIG. 5 is a suction side perspective view of a turbine rotor blade and tip shroud including a tip shroud cooling passage, according to embodiments of the disclosure.
Figure 6:
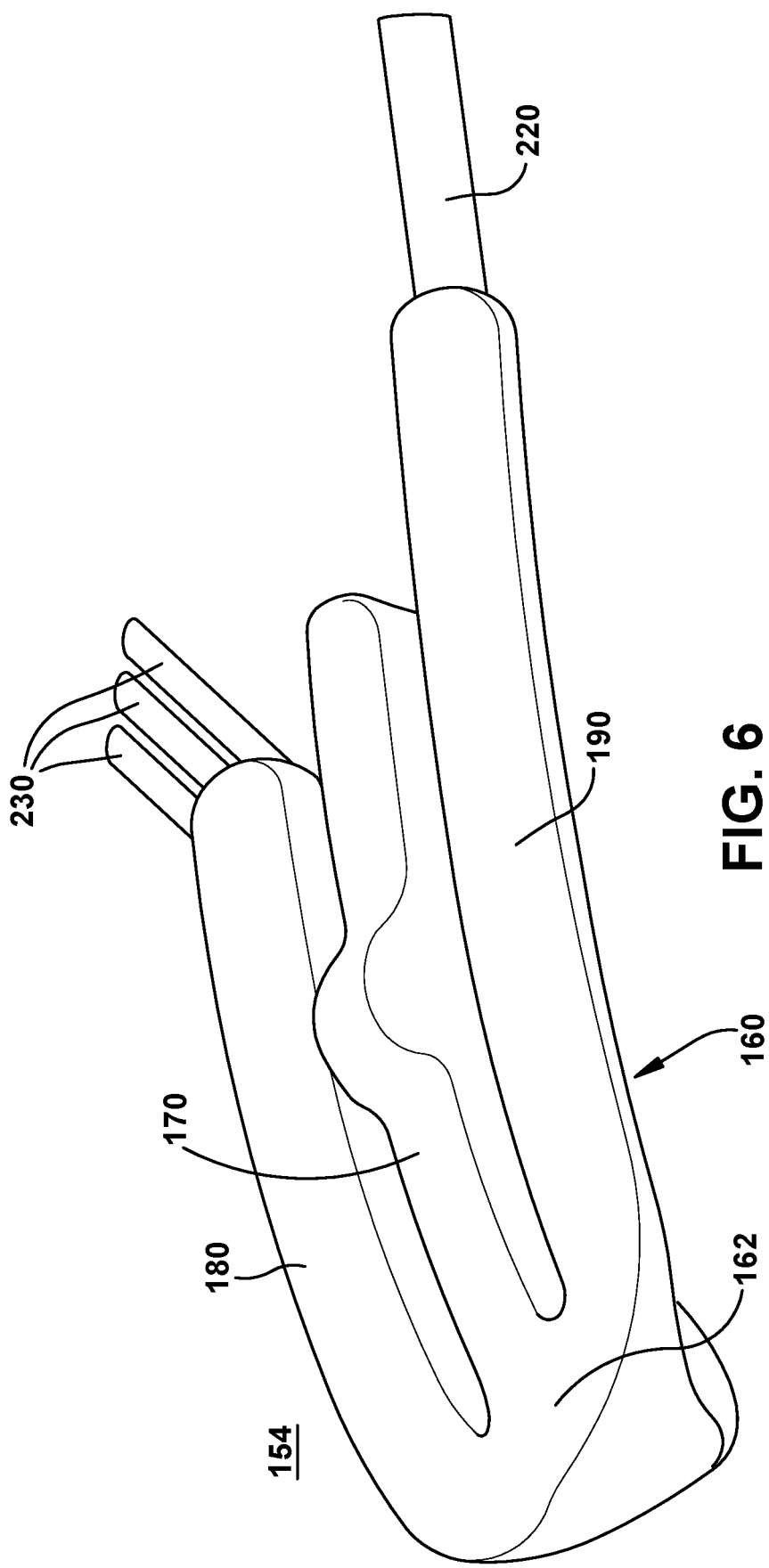
FIG. 6 is a perspective, negative view of a tip shroud cooling passage apart from a tip shroud body, according to various embodiments of the disclosure.
Figure 7:
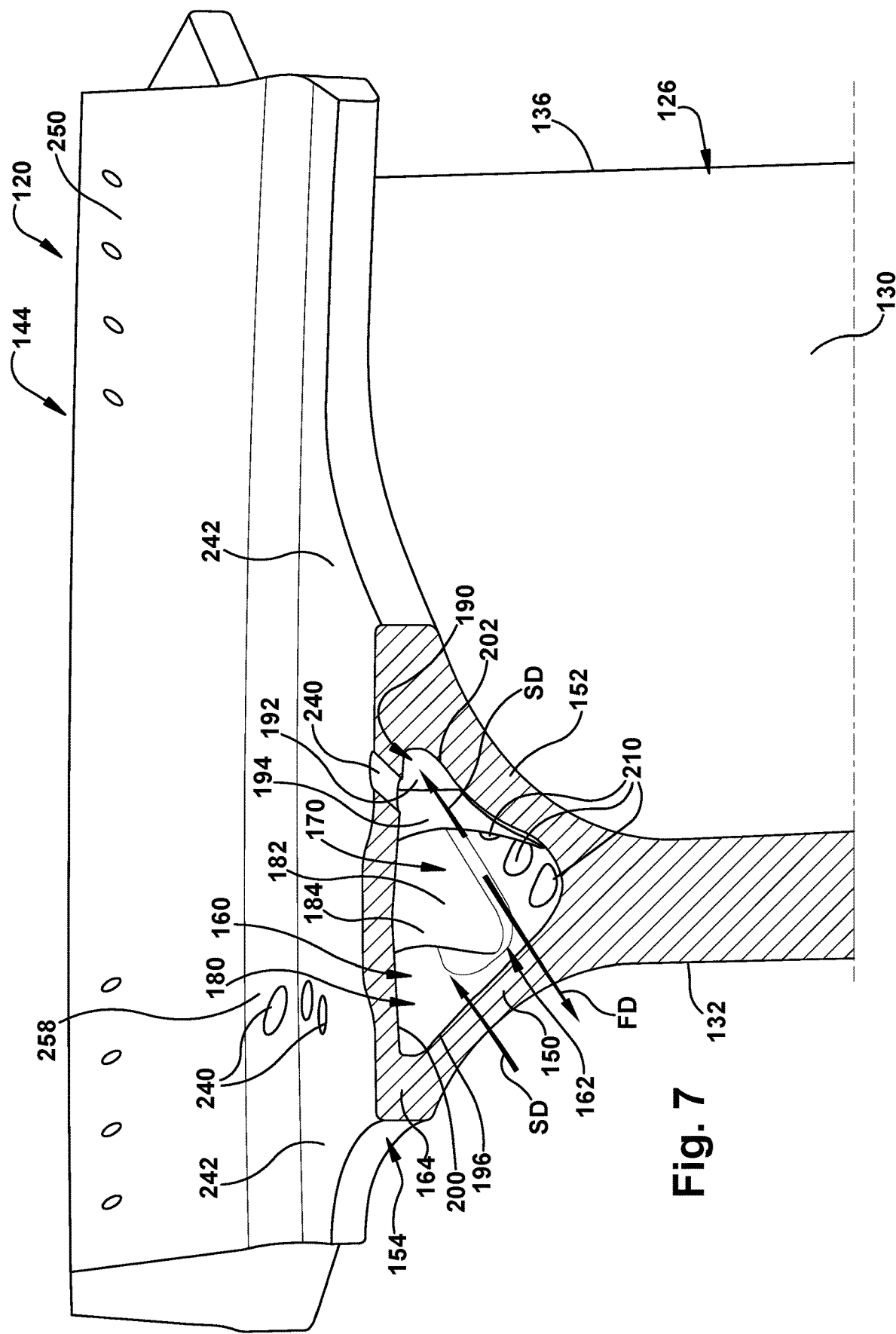
FIG. 7 is a cross-sectional view of a tip shroud, according to embodiments of the disclosure, as taken along line 7-7 in FIG. 4.
Figure 8:
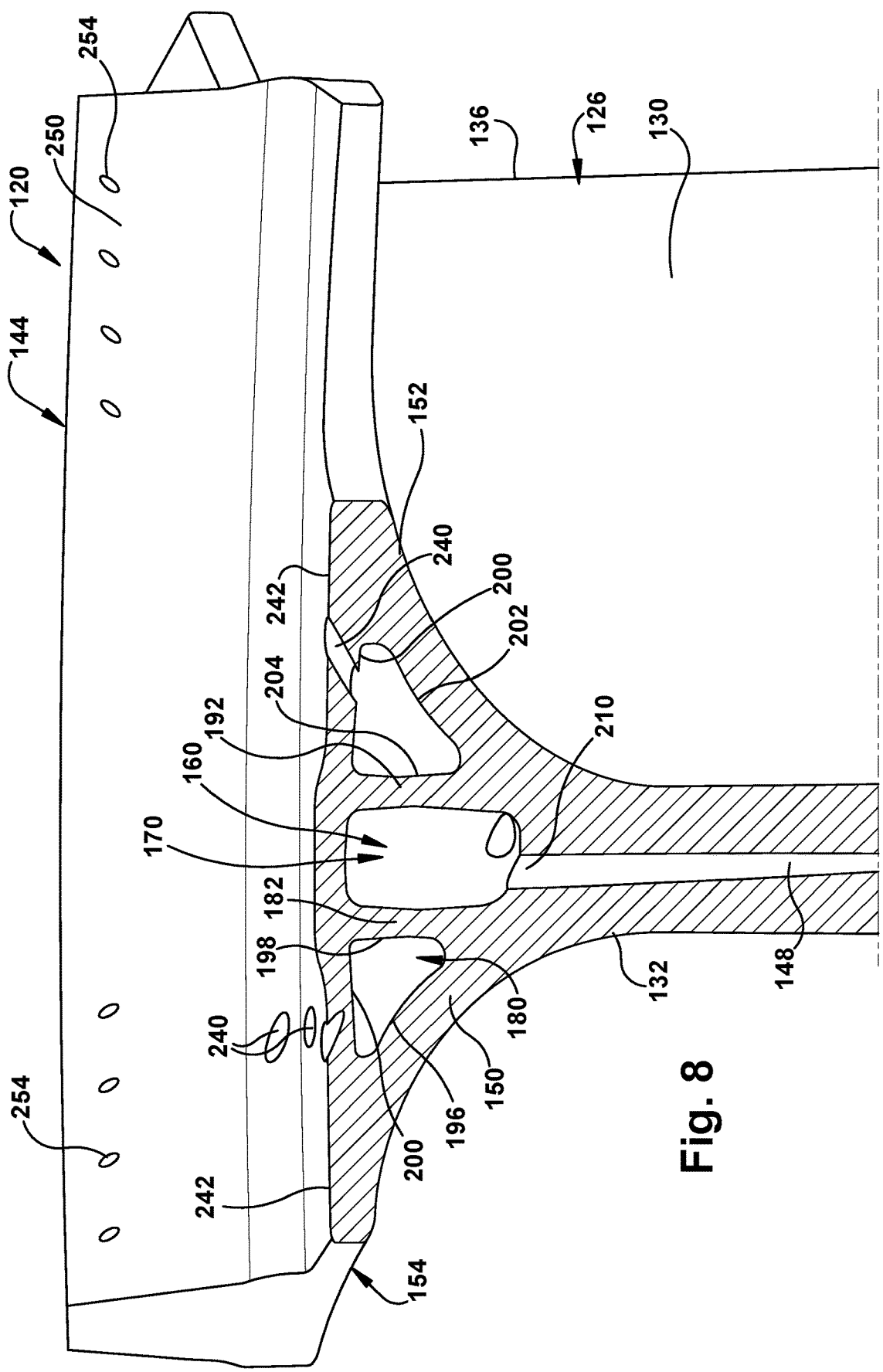
FIG. 8 is a cross-sectional view of a tip shroud, according to embodiments of the disclosure, as taken along line 8-8 in FIG. 4.
Figure 9:
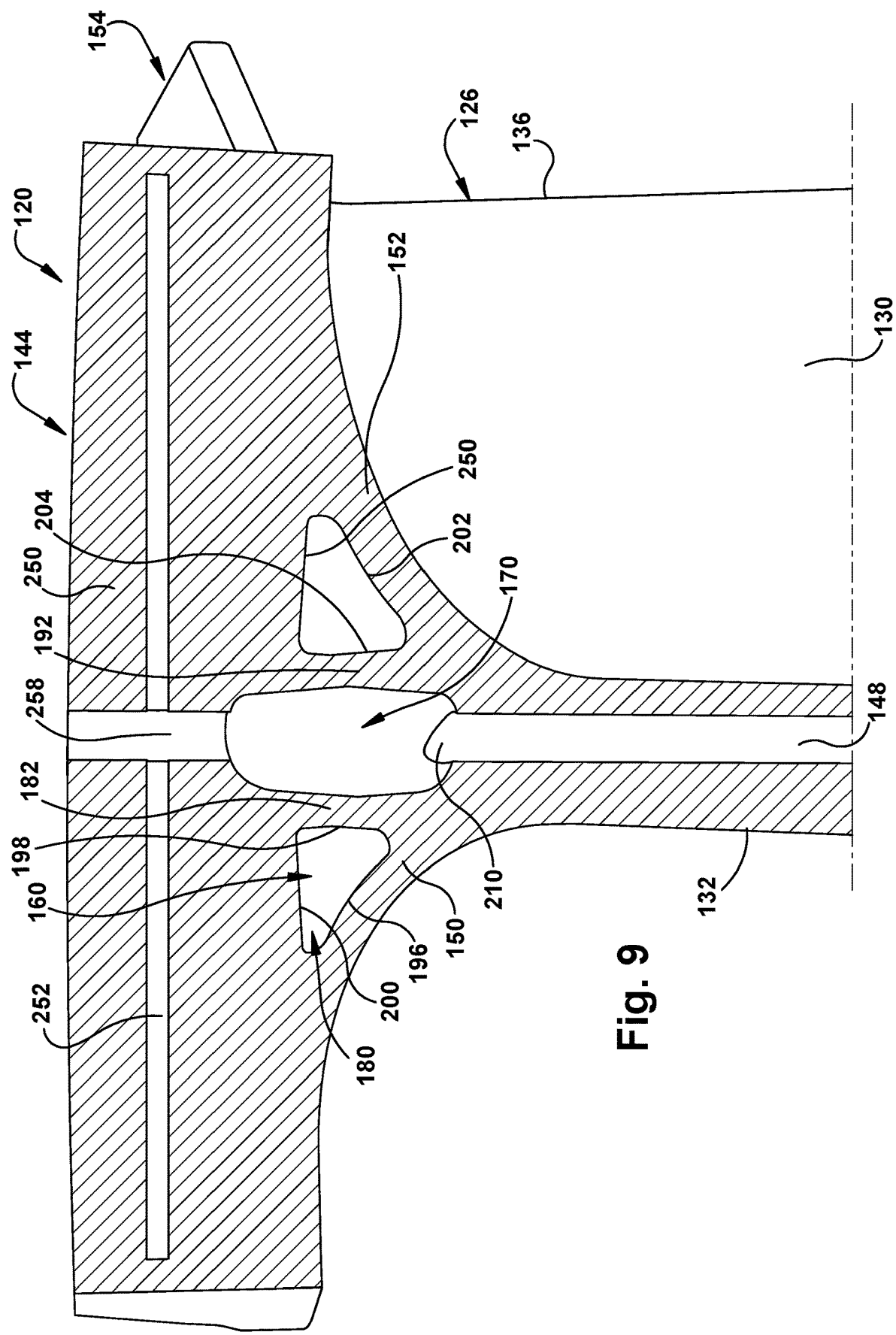
FIG. 9 is a cross-sectional view of a tip shroud, according to embodiments of the disclosure, as taken along line 9-9 in FIG. 4.
Figure 10:
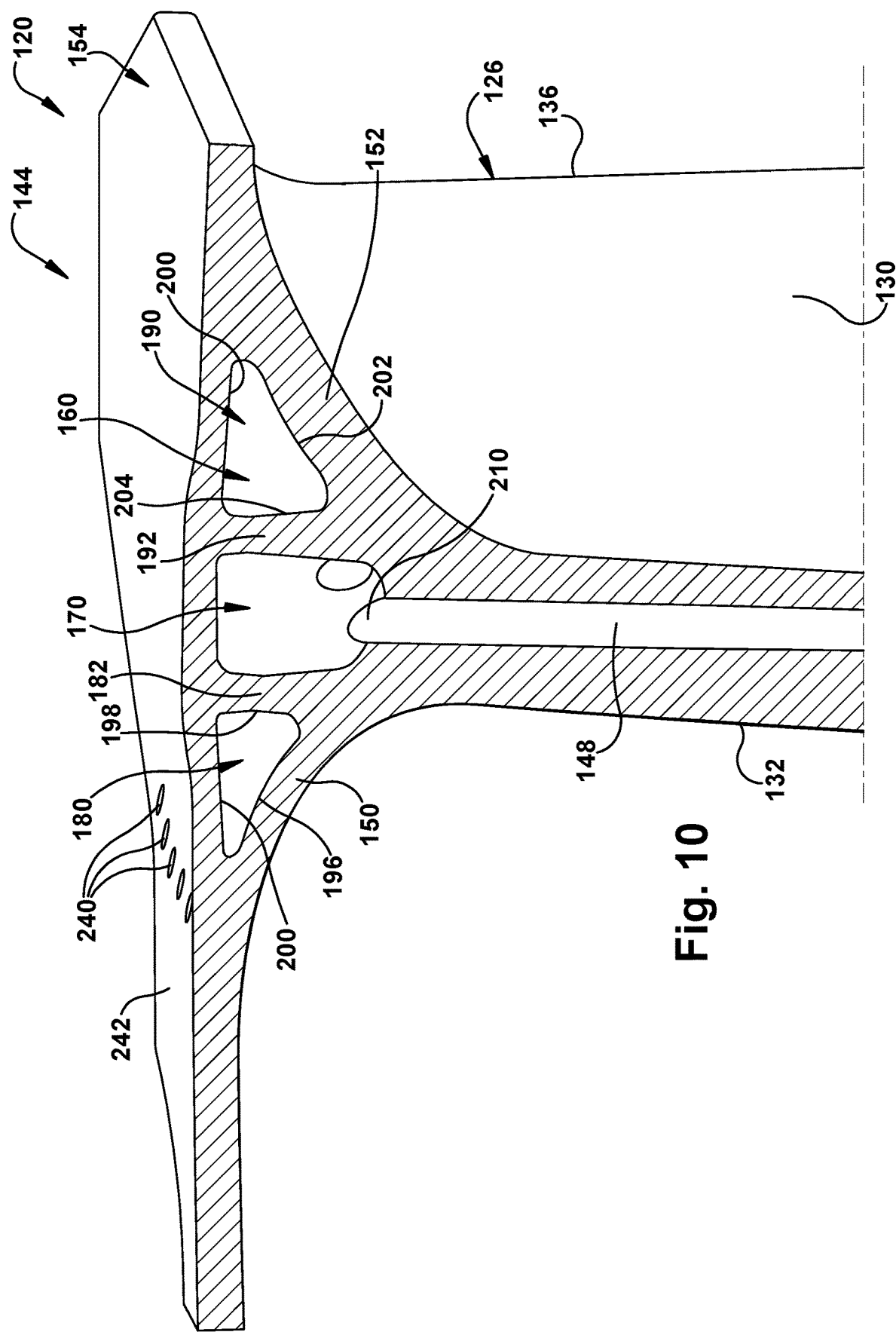
FIG. 10 is a cross-sectional view of a tip shroud, according to embodiments of the disclosure, as taken along line 10-10 in FIG. 4.
Figure 11:
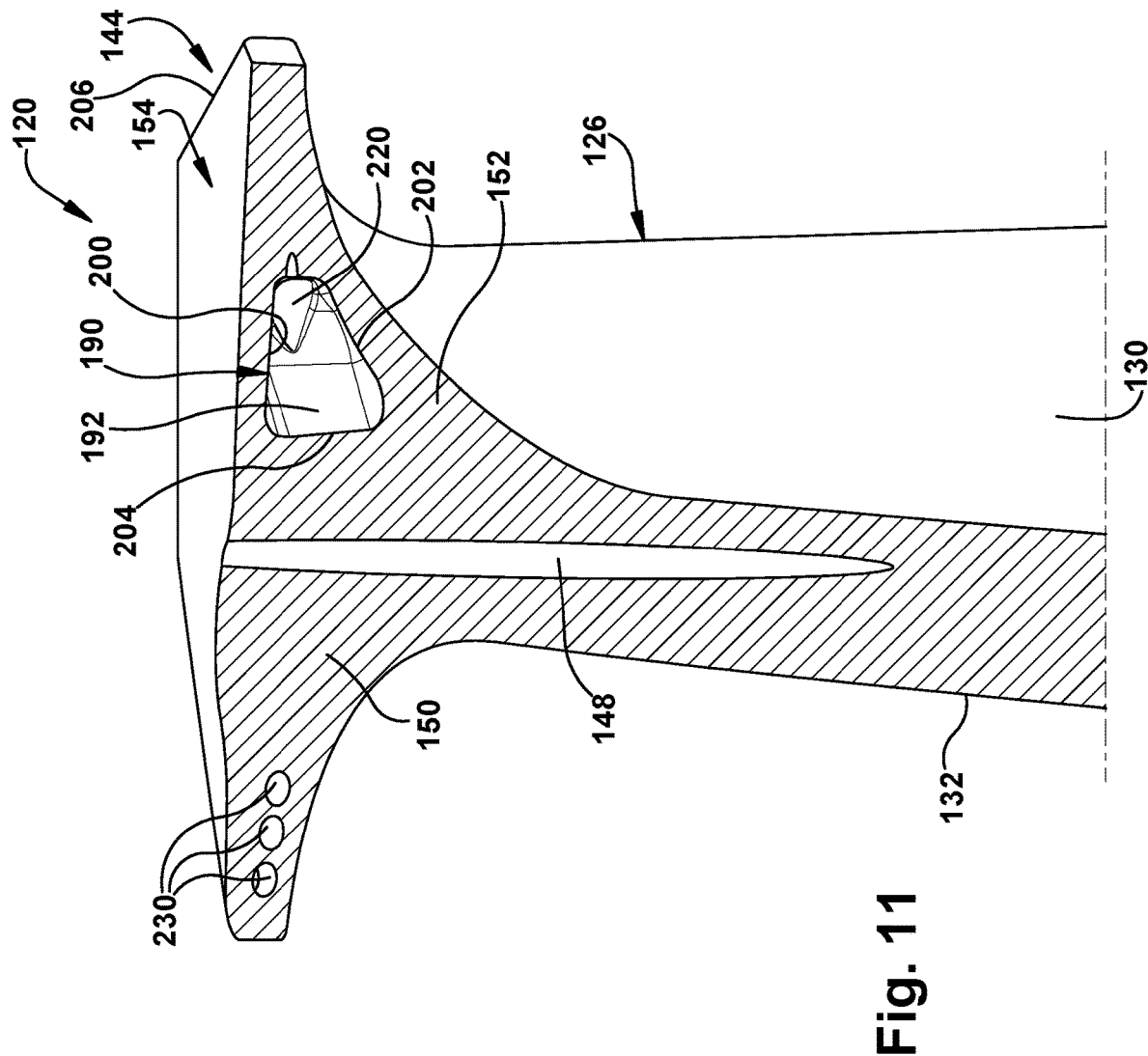
FIG. 11 is a cross-sectional view of a tip shroud, according to embodiments of the disclosure, as taken along line 11-11 in FIG. 4.

FIGS. 4, 5, and 7-11 show various views of tip shroud 144 including shroud cooling passage 160, and FIG. 6 shows a perspective, negative view of shroud cooling passage 160 apart from tip shroud body 154 (FIGS. 4-5), according to various embodiments of the disclosure. More specifically, FIG. 4 is a top down view of tip shroud 144, and FIG. 5 is a suction side perspective view of tip shroud 144, with each figure showing shroud cooling passage 160 therein. FIG. 4 includes a number of cross-sectional view lines that will be used to illustrate and describe shroud cooling passage 160 relative to FIGS. 7-11. FIG. 7 is a cross-sectional view along line 7-7 in FIG. 4; FIG. 8 is a cross-sectional view along line 8-8 in FIG. 4; FIG. 9 is a cross-sectional view along line 9-9 in FIG. 4; FIG. 10 is a cross-sectional view along line 10-10 in FIG. 4; and FIG. 11 is a cross-sectional view along line 11-11 in FIG. 4.

As shown in the drawings, shroud cooling passage 160 (FIG. 5) may have a substantially trident shape, i.e., three pronged. More specifically, as shown in FIGS. 4-7, shroud cooling passage 160 includes a trunk cooling passage 162. Trunk cooling passage 162, as will be described, fluidly couples the other branch passages together near a forward end 164 (FIGS. 4, 5, 7) of shroud body 154. Shroud cooling passage 160 also includes a center cooling passage 170 in fluid communication with trunk cooling passage 162, a suction side cooling passage 180 separated from center cooling passage by a first wall 182 that terminates at an end 184 within trunk cooling passage 162, and a pressure side cooling passage 190 separated from center cooling passage 170 by a second wall 192 that terminates at an end 194 within trunk cooling passage 162. Center cooling passage 170, suction side cooling passage 180 and pressure side cooling passage 190 are in fluid communication with trunk cooling passage 162, forming the substantially trident shape of cooling passage 160. Trunk cooling passage 162, center cooling passage 170, suction side cooling passage 180, and pressure side cooling passage 190 collectively have a substantially trident-shape, e.g., trunk cooling passage having three cooling passages ("prongs") extending therefrom (no points on end thereof), which are not necessarily symmetrical or of equal length. Relative to the axial direction defined by turbine rotor 110 (FIGS. 1 and 2), center cooling passage 170, suction side cooling passage 180, and pressure side cooling passage 190 extend generally in a circumferential direction, i.e., from trunk cooling passage 162.

As shown best in FIGS. 4, 5 and 7, suction side cooling passage 180 extends adjacent suction side fillet 150, and pressure side cooling passage 190 extends adjacent pressure side fillet 152. As shown in FIGS. 8-10, each suction side cooling passage 180 is defined by an internal surface 196 of suction side fillet 150, an outer surface 198 of first wall 182, and a radially inner surface 200 of shroud body 154. Similarly, as shown in FIGS. 8-11, each pressure side cooling passage 190 is defined by an internal surface 202 of pressure side fillet 152, an outer surface 204 of second wall 192, and radially inner surface 200 of shroud body 154. Hence, each suction side and pressure side cooling passage 180, 190 may have a substantially triangular cross-section in at least part of its length.

Shroud cooling passage 160 may include an opening 210 to coolant chamber 148 to allow coolant to pass to shroud cooling passage 160 to cool, inter alia, shroud body 154. Coolant passing through each passage 162, 170, 180, and 190 thus actively cools the respective fillets 150, 152. In one embodiment, at least one opening 210 fluidly couples center cooling passage 170 to coolant chamber 148. As shown in FIGS. 7-11, any number of opening(s) 210 may be employed. The number of opening(s) 200 may vary, for example, based on the nature of coolant chamber 148. For example, as shown in FIGS. 5 and 7, coolant chamber 148 may include a number of passages, any number of which may open into center cooling passage 170 at a respective opening 210. Alternatively, a single opening 210 may fluidly connect center cooling passage 170 to a single coolant chamber 148, the latter shown in FIG. 3.

In operation, as shown in FIG. 7, at least a portion of the coolant flows through center cooling passage 170 in a first direction (FD) into trunk cooling passage 162, and then through suction side cooling passage 180 and pressure side cooling passage 190 in a different, second direction (SD). In the example shown, the first direction is substantially forward towards leading edge 134 (FIG. 3) of airfoil 126 and forward end 164 (FIGS. 4 and 5) of shroud body 154, and the second direction is substantially aft toward trailing edge 136 (FIG. 7) of airfoil 126 and an aft end 206 (FIGS. 4-5) of shroud body 154. Some of coolant entering center cooling passage 170 may also pass within center cooling passage 170 in a substantially aft direction, e.g., where an outlet for the coolant is provided in an aft region of center cooling passage 170.

As shown in the figures, each of the suction side, center and pressure side cooling passages 180, 170, 190 may have a different length. The different lengths allow each passage to cool only the extent necessary, allowing other structure, e.g., smaller cooling passages, etc., to be present within shroud body 154. The lengths can be customized to accommodate different size tip shrouds 144 and cooling requirements. While shown with all different lengths, two or more of the center, suction side and pressure side cooling passages 170, 180, 190 may also have the same length. In addition, a cross-sectional area and path of shroud cooling passage 160, including any or all passages 162, 170, 180, 190, may be sized to accommodate different size tip shrouds 144 and cooling requirements. The cross-sectional area size and shape of the passages 162, 170, 180, 190 may also change over their lengths to provide any desired cooling.

Referring to FIGS. 4-6 and 11, in one embodiment, shroud cooling passage 160 may also include at least one cooling vent 220 fluidly coupled to pressure side cooling passage 190 for discharging the coolant from the shroud cooling passage 160 out a circumferential end edge of tip shroud 144. As shown best in FIG. 6, cooling vent 220 has a cross-sectional area less than a cross-sectional area of pressure side cooling passage 190. Any number of cooling vents 220 may be employed and they may have any cross-sectional shape to provide the desired cooling.

Referring still to FIGS. 4-6 and 11, in one embodiment, shroud cooling passage 160 may also include at least one cooling vent 230 fluidly coupled to suction side cooling passage 180 for discharging the coolant from the shroud cooling passage 260 to, for example, suction side fillet 150 of tip shroud 144. As shown in FIG. 6, each cooling vent 230 has a cross-sectional area less than a cross-sectional area of suction side cooling passage 180. Any number of cooling vents 230 may be employed, and they may have any cross-sectional shape to provide the desired cooling.

In addition, or in the alternative, as shown in FIGS. 7, 8 and 10, suction side cooling passage 180 and/or pressure side cooling passage 190 may include at least one cooling vent 240 to an outer radial surface 242 of shroud body 154. Note, cooling vent(s) 240 are not shown in FIG. 6 for clarity. Cooling vent(s) 240 is/are shown for pressure side cooling passage 190 in, for example, FIGS. 7 and 8, and cooling vent(s) 240 is/are shown for suction side cooling passage 180, for example, in FIGS. 7, 8 and 10. Any number of cooling vents 240 may be employed.

As shown in FIGS. 4, 5 and 7-9, turbine blade 120 may also include a tip rail 250 extending radially outward from shroud body 154 to interact with an internal surface of a casing of GT system 100 (FIG. 1). Shroud cooling passage 160 is positioned radially inward of tip rail 250, i.e., extending under the tip rail 250. In one embodiment, shown in FIG. 9, turbine blade 120 may also include at least one tip rail cooling passage 252 in tip rail 250 (two shown). Tip rail cooling passage(s) 252 may extend anywhere within tip rail 250 to provide cooling and may include any variety of vents 254 (as in FIG. 8) to allow coolant to exit tip rail 250.

As shown in FIG. 9, in one embodiment, tip rail cooling passage(s) 252 may be in fluid communication with center cooling passage 170 of shroud cooling passage 160, e.g., via passage(s) 258, to allow coolant to pass therefrom to tip rail 250. Passage(s) 258 may additionally or alternatively fluidly communicate with suction side cooling passage 180 and/or pressure side cooling passage 190. Cooling vents 240 may also be provided through a tip rail fillet 258, as shown in FIG. 7.

Referring to FIG. 7, trunk cooling passage 162 may extend radially inward along an internal surface 196 of suction side fillet 150 and internal surface 202 of pressure side fillet 150. In this manner, as shown also in FIG. 6, trunk cooling passage 162 has a radially-extending, rounded triangular cross-section that provides enhanced cooling to a forward portion of fillets 150, 152.

Shroud cooling passage 160, as described herein, supplies coolant to the center of shroud body 154, and then to fillets 150, 152, creating a cross-flow behind fillets 150, 152 to enhance the heat transfer coefficient. The tip shroud cooling passage 260 keeps the fillets 150, 152 cool without the use of intricate passages and does not interfere with aerodynamic performance. Hence, tip shroud cooling passage 160 does not limit placement of other structure and reduces areas of high stress and/or fatigue in tip shroud 144.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbine blade, comprising:
   a root for fixing to a turbine rotor;
   an airfoil coupled to the root, the airfoil including a suction side and a pressure side, and at least one internal wall defining a coolant chamber with the airfoil for delivering a coolant through the airfoil; and
   a tip shroud coupled to a radially outer end of the airfoil by a suction side fillet and a pressure side fillet, wherein the tip shroud includes a shroud body defining a shroud cooling passage for receiving the coolant, the shroud cooling passage including:
   a trunk cooling passage,
   a center cooling passage in fluid communication with the trunk cooling passage and extending linearly from the trunk cooling passage to an aft end of the center cooling passage,
   a suction side cooling passage separated from the center cooling passage by a first wall that terminates at an end within the trunk cooling passage, the suction side cooling passage in fluid communication with the trunk cooling passage and extending linearly from the trunk cooling passage to an aft end of the suction side cooling passage, and
   a pressure side cooling passage separated from the center cooling passage by a second wall that terminates at an end within the trunk cooling passage, the pressure side cooling passage in fluid communication with the trunk cooling passage and extending linearly from the trunk cooling passage to an aft end of the pressure side cooling passage, wherein the suction side cooling passage extends adjacent the suction side fillet, and the pressure side cooling passage extends adjacent the pressure side fillet.

2. The turbine blade of claim 1, further comprising at least one opening fluidly coupling the center cooling passage to the coolant chamber, wherein at least a portion of the coolant flows through the center cooling passage in a first direction into the trunk cooling passage and then through the suction side cooling passage and the pressure side cooling passage in a different, second direction.

3. The turbine blade of claim 1, wherein each of the suction side, center and pressure side cooling passages has a different length.

4. The turbine blade of claim 1, further comprising at least one cooling vent fluidly coupled to the pressure side cooling passage for discharging the coolant from the shroud cooling passage out a circumferential end edge of the tip shroud, wherein each cooling vent has a cross-sectional area less than a cross-sectional area of the pressure side cooling passage.

5. The turbine blade of claim 1, further comprising at least one cooling vent fluidly coupled to the suction side cooling passage for discharging the coolant from the shroud cooling passage to the suction side fillet of the tip shroud, wherein each cooling vent has a cross-sectional area less than a cross-sectional area of the suction side cooling passage.

6. The turbine blade of claim 1, wherein at least one of the suction side cooling passage and the pressure side cooling passage includes at least one cooling vent to an outer radial surface of the shroud body.

7. The turbine blade of claim 1, further comprising:
a tip rail extending radially outward from the shroud body, the shroud cooling passage positioned radially inward of the tip rail.

8. The turbine blade of claim 1, further comprising a tip rail extending radially outward from the shroud body, the shroud cooling passage extending under the tip rail; and at least one tip rail cooling passage in the tip rail, the at least one tip rail cooling passage in fluid communication with the center cooling passage of the shroud cooling passage.

9. The turbine blade of claim 1, wherein the trunk cooling passage extends radially inward along an internal surface of the suction side fillet and an internal surface of the pressure side fillet.

10. The turbine blade of claim 1, wherein the trunk cooling passage has a radially-extending, rounded triangular cross-section.

11. The turbine blade of claim 1, wherein the trunk cooling passage, the center cooling passage, the suction side cooling passage, and the pressure side cooling passage collectively have a substantially trident-shape.

12. A turbine blade, comprising:
a root for fixing to a turbine rotor;
an airfoil coupled to the root, the airfoil including a suction side and a pressure side, and at least one internal wall defining a coolant chamber in the airfoil for delivering a coolant through the airfoil; and
a tip shroud coupled to a radially outer end of the airfoil by a suction side fillet and a pressure side fillet, wherein the tip shroud includes a shroud body defining a substantially trident-shaped shroud cooling passage including: a trunk cooling passage, a center cooling passage in fluid communication with the trunk cooling passage and extending linearly from the trunk cooling passage to an aft end of the center cooling passage, a suction side cooling passage in fluid communication with the trunk cooling passage and extending linearly from the trunk cooling passage to an aft end of the suction side cooling passage, and a pressure side cooling passage in fluid communication with the trunk cooling passage and extending linearly from the trunk cooling passage to an aft end of the pressure side cooling passage;

wherein the center cooling passage is fluidly coupled to the coolant chamber to receive a coolant therefrom.

13. The turbine blade of claim 12, wherein the shroud body defines the substantially trident-shaped shroud cooling passage with the suction side cooling passage separated from the center cooling passage by a first wall that terminates at an end within the trunk cooling passage, and the pressure side cooling passage separated from the center cooling passage by a second wall that terminates at an end within the trunk cooling passage;

wherein each of the suction side, center and pressure side cooling passages extends circumferentially from the trunk cooling passage.

14. The turbine blade of claim 12, further comprising at least one opening fluidly coupling the center cooling passage to the coolant chamber;

wherein at least a portion of the coolant flows through the center cooling passage in a first direction into the trunk cooling passage and then through the suction side cooling passage and the pressure side cooling passage in a different, second direction.

15. The turbine blade of claim 12, wherein each of the suction side, center and pressure side cooling passages has a different length.

16. The turbine blade of claim 12, further comprising at least one cooling vent fluidly coupled to the pressure side cooling passage for discharging the coolant from the shroud cooling passage out a circumferential end edge of the tip shroud, wherein each cooling vent has a cross-sectional area less than a cross-sectional area of the pressure side cooling passage.

17. The turbine blade of claim 12, further comprising at least one cooling vent fluidly coupled to the suction side cooling passage for discharging the coolant from the shroud cooling passage to the suction side fillet of the tip shroud, wherein each cooling vent has a cross-sectional area less than a cross-sectional area of the suction side cooling passage.

18. The turbine blade of claim 12, wherein at least one of the suction side cooling passage and the pressure side cooling passage includes at least one cooling vent to an outer radial surface of the shroud body.

19. The turbine blade of claim 12, further comprising:
a tip rail extending radially outward from the shroud body, the shroud cooling passage positioned radially inward of the tip rail; and
at least one tip rail cooling passage in the tip rail, the at least one tip rail cooling passage in fluid communication with the center cooling passage of the shroud cooling passage.

20. The turbine blade of claim 12, wherein the trunk cooling passage extends radially inward along an internal surface of the suction side fillet and an internal surface of the pressure side fillet.

* * * * *